Oct. 11, 1966  E. O. PARSON  3,278,396
WATER PURIFICATION DISTILLATON APPARATUS
Filed July 26, 1963
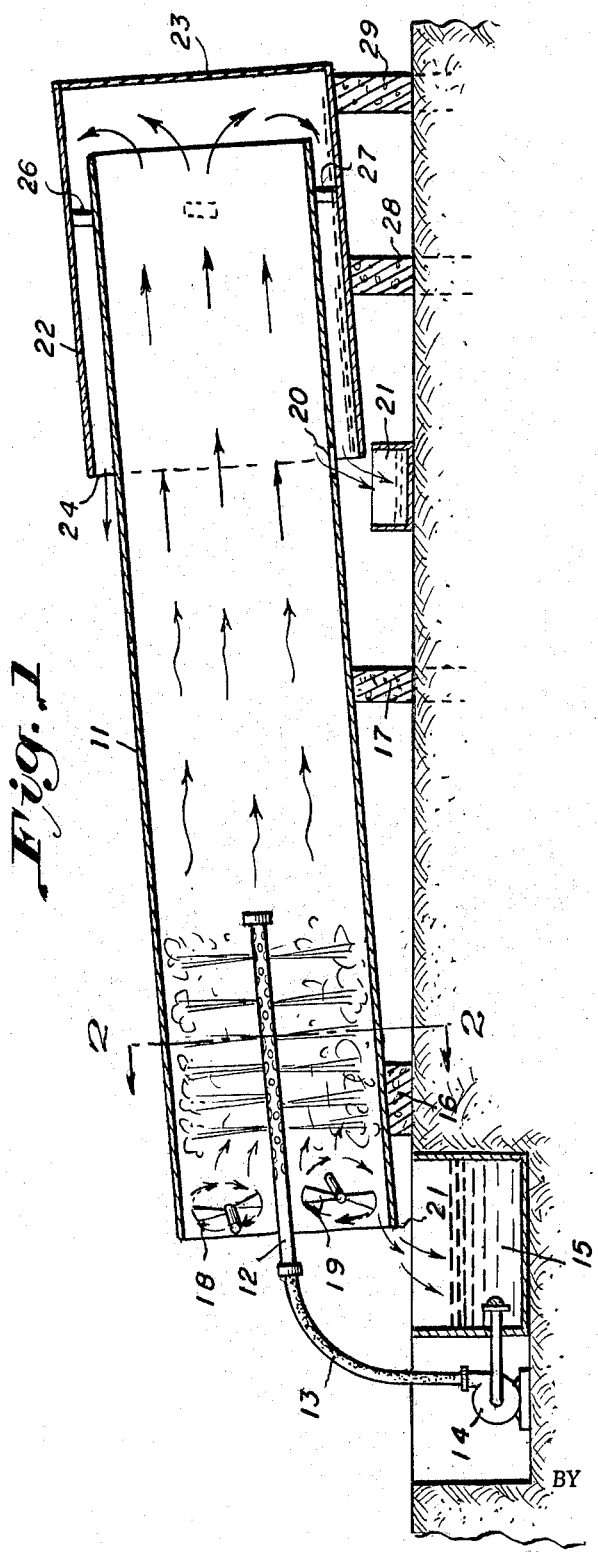
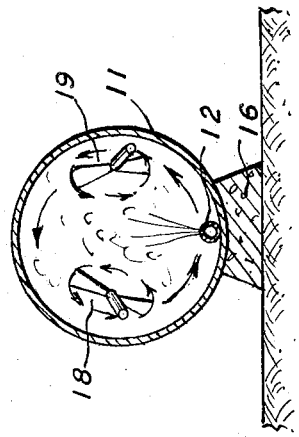
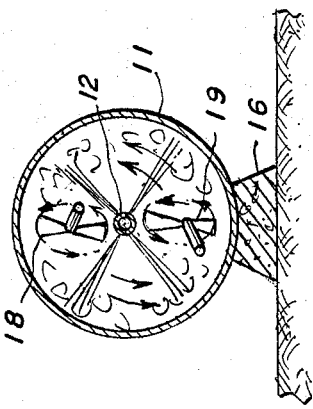
INVENTOR
EDWARD O. PARSON
BY Eric P. Schellin
ATTORNEY

3,278,396
WATER PURIFICATION DISTILLATION APPARATUS
Edward O. Parson, 1910 Kalorama Road NW., Washington, D.C.
Filed July 26, 1963, Ser. No. 297,770
3 Claims. (Cl. 202—190)

This invention relates to a method and apparatus for feeding a distillable material into a distillation zone and controlling the flow thereof in order to effect purification of the distillable material.

Considerable activity has been evidenced in the last few years in purifying saline water. In other words, due to the great increase in consumption of water, many methods have been investigated with the hopes of producing a relatively cheap form of water emanating from vast quantities of saline water.

Accordingly, the object of the present invention concerns water purification.

Another object of the present invention is to teach the concept of using humidification systems in distilling saline water.

It is another object of the present invention to disclose a unique concept having economic capabilities and efficiencies in producing purified water.

Other objects and advantages of the present invention will become apparent upon a detailed consideration of the invention wherein:

FIGURE 1 is a longitudinal cross-sectional view of the device of the present invention.

FIGURE 2 is a cross-sectional view taken along lines 2—2 of FIGURE 1.

FIGURE 3 is a cross-sectional view along the same lines showing a different embodiment.

Attention is now directed to FIGURE 1 which shows the present invention in detail. An elongated tube 11 is mounted on an inclined basis of approximately 15° from the horizontal. The tube 11 has a dimension of approximately 3 feet in diameter and a length of approximately 30 feet. The tube 11 is divided into three operating zones. To the left is a first zone, having approximately 10 feet length or one-third of the entire tube 11, is a water spraying system. This system comprises a spray pipe 12 secured axially with respect to the tube 11 and having a plurality of nozzles thereon through which saline water is sprayed towards the inner surface of the tube 11. A flexible conduit 13 connects spray pipe 12 with a standard pump 14 which obtains the saline water from a reservoir 15. The elongated tube 11 is mounted on concrete blocks such as at 16 and 17.

The tube 11 is open at both ends. At the left end are two fans 18 and 19 positioned to drive air from the outer atmosphere into the tube and across the sprayed water. The axis of the fans 18 and 19 are positioned at an acute angle with respect to an imaginary transverse line passing through the tube 11. This angle is approximately 45° with respect to said imaginary transverse line. The reason for positioning the fans in this arrangement is to drive the sprayed water not only down the tube 11 to the right but also in a manner against the inner periphery in order to effect a swirling or cyclonic movement. The two fans are positioned to cooperate in this manner so that one fan is at an acute angle in one direction and the other fan is in the other direction. The axes of the fans are therefore 90° apart. In other words, the inclination of one fan is in one direction with its driving force and the other fan below is in an inclination in the other direction with its driving force.

The second zone is that area to the right after the spray pipe 12 and comprises also about a ten foot length or one-third of the elongated tube 11. In this portion the excess water that is thrown forward flows along the inner surface of the tube 11 and accumulates with the excess water being sprayed in the first zone and runs back into the reservoir 15 over edge 21 of the tube.

By positioning the arrangement of the present invention in a relatively arid area, dry air is blown by the fans 18 and 19 into the tube. Naturally, the device of the present invention would find its greatest applicability in such areas due to the fact of the paucity of available fresh water while at the same time there is much saline water. The dry air as it is blown across the sprayed water increases in humidity while the excess of the water returns to reservoir 15 as has been stated.

The third zone also approximately ten feet in length is the condensation zone for condensing the water from the now humidified air. The third zone consists of that portion of the tube 11 surrounded by an outer cap 22 having a closed back portion 23. The outer cap 22 is of such a diameter to permit easy egress of the moving air outwardly against the back portion 23 of the cap 22 and then along the outer periphery of the tube 11 and finally emanates at the end of the cap at 24. The cap 22 is concentrically positioned with respect to tube 11 by means of support members 26. Additionally, the cap is supported by concrete piers 28 and 29. The cap 22 by shading the end portion of one-third of the tube 11 maintains that portion of the tube in a cooler condition than the major part of the tube, that is, the first two zones of the tube 11. Being cooler, the humid air condenses some of its moisture therefrom which collects at the back portion 23 or in the inner periphery of the tube 11 and due to the inclination of tube 11 flows backwardly toward aperture 30 and into receiving receptacle 31. Additional water collects from the back portion 23 and flows downwardly along the inner periphery of the cap 22 towards the receiving receptacle 31.

Attention is directed to FIGURE 2 which clearly shows the inclination of fans 18 and 19. The fans are powered by electric motors (not shown).

For another embodiment of the present invention attention is directed to FIGURE 3 where the distribution or spraying pipe 12 is positioned along the bottom inner periphery of the tube 11. The fans are also mounted on a bias so that a cyclonic effect is produced in the tube 11.

The tube 11 may be constructed of metal for best distribution and heat disposition. Additionally, the tube should be either coated with non-corrosive metals inasmuch as the invention deals with the utilization of saline water in the lower two-thirds which would subject the arrangement of the present invention to considerable corrosion unless provision is made to avoid same.

It will be apparent that mnay changes and modifications of the several features described herein may be made without departing from the spirit and scope of the invention. It is therefore apparent that the foregoing description is by way of illustration of the invention rather than limitation of the invention.

What is claimed is:

1. A device for effecting purification of saline water comprising an elongated open ended tube mounted at an incline from the horizontal, said tube being divided into three zones wherein in the lowermost zone a spray arrangement is positioned for spraying saline water, said spray arrangement being supplied with saline water by means of a pump which pumps saline water from a source, said lowermost zone having at the mouth of said tube two fans for blowing air through said tube, said fans being biased with respect to the axis of said tube in order to blow air in a swirling manner through said tube, said second zone of said tube being of a dimension in length approximately the same as said first zone, said third zone being of a length approximately the same as each of the other two zones, said third zone being surrounded by a cap spaced from the end of the tube and being spaced from the outer periphery of said tube mounted concentrically with respect to said tube.

2. The device of claim 1 wherein the tube is inclined at approximately 15° from the horizontal.

3. The device of claim 1 wherein the axes of the fans are biased approximately 45° from the longitudinal axis of the tubes and each fans is biased in an opposite direction.

References Cited by the Examiner

UNITED STATES PATENTS

| | | |
|---|---|---|
| 1,138,380 | 5/1915 | Harris et al. |
| 2,018,049 | 10/1935 | Allen _____ 202—236 |
| 2,188,506 | 1/1940 | Hall. |
| 2,372,846 | 4/1945 | Nettel et al. _____ 203—11 X |
| 3,163,587 | 12/1964 | Champe _____ 203—10 X |

FOREIGN PATENTS 1,585   1858   Great Britain.

NORMAN YUDKOFF, *Primary Examiner.*

F. E. DRUMMOND, *Assistant Examiner.*